F. S. STEARNS.
ELECTRIC WELDING APPARATUS.
APPLICATION FILED AUG. 14, 1916. RENEWED SEPT. 26, 1922.
1,435,751.
Patented Nov. 14, 1922.
2 SHEETS—SHEET 1.
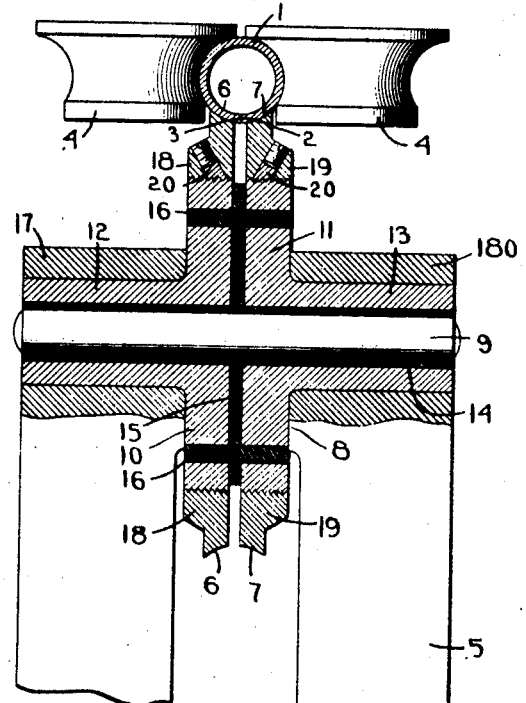
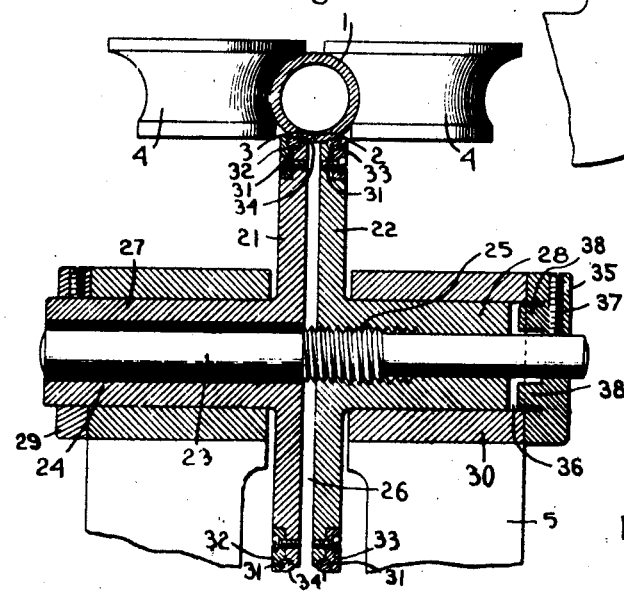
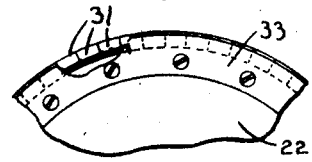
Inventor.
Frederick S. Stearns
by Howard Smith Reneant
Attys F. S. STEARNS.
ELECTRIC WELDING APPARATUS.
APPLICATION FILED AUG. 14, 1916. RENEWED SEPT. 26, 1922.
1,435,751.
Patented Nov. 14, 1922.
2 SHEETS—SHEET 2.
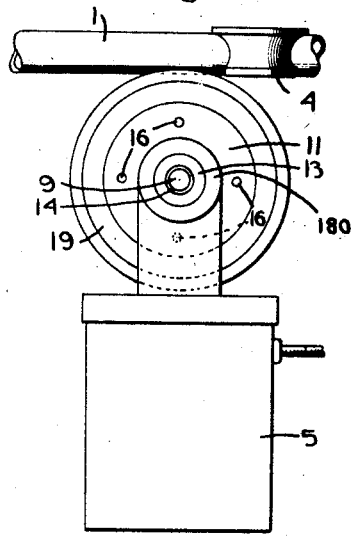
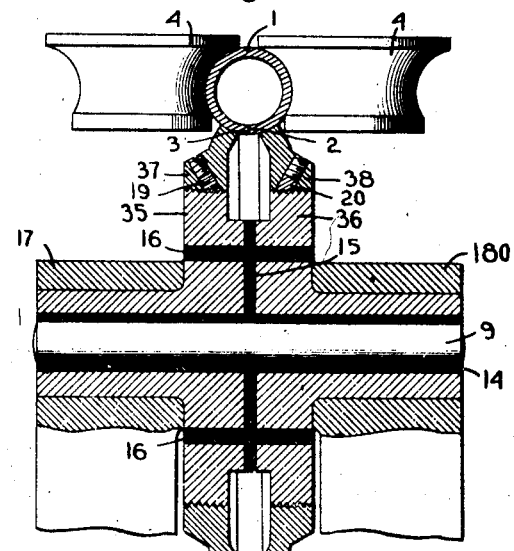
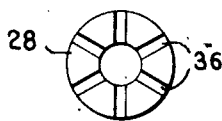
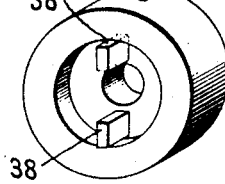
Inventor
Frederick S. Stearns
by Heard Smith & Tennant
Attys Patented Nov. 14, 1922.

1,435,751

UNITED STATES PATENT OFFICE.

FREDERICK S. STEARNS, OF SWAMPSCOTT, MASSACHUSETTS, ASSIGNOR TO FRANCIS G. GALE, OF WATERVILLE, CANADA.

ELECTRIC WELDING APPARATUS.

Application filed August 14, 1916, Serial No. 114,681. Renewed September 26, 1922. Serial No. 590,748.

*To all whom it may concern:*

Be it known that I, FREDERICK S. STEARNS, a citizen of the United States, residing at Swampscott, county of Essex, State of Massachusetts, have invented an Improvement in Electrical Welding Apparatus, of which the following description, in connection with the accompanying drawing, is a specification, like characters on the drawing representing like parts.

This invention relates to electric welding apparatus of that type which is designed for making a welded tube and it relates particularly to the contact element of the device by which the welding current is conveyed to the joint or seam to be welded.

In all electric welding machines for welding tubes with which I am familiar, it is customary to provide two contact rolls which are independent from each other and independently mounted and under which the tube passes, said rolls being connected to the secondary and being constructed so that they contact with the tube at either side of the joint or seam to be welded, and also to provide two pressure rolls or other pressure elements between which the tube passes as the welding is performed and which operate to complete the weld by forcing together the edges to be welded when they are properly heated by the current from the contact rolls.

My present invention aims to improve apparatus of this nature by providing a single contact roll having two contact surfaces that are insulated from each other but both connected to the secondary and which are arranged to engage the tube at either side of the seam or joint as the latter is passed over said roll. By using a single roll of this nature, the construction of the device is simplified as a single shaft only is necessary for supporting the roll.

In order to adapt the device for welding tubes of different sizes, I propose to form the two contact surfaces on two contact members that are detachably carried by the roll so that contact members of different shapes and sizes may be employed, depending on the character of the tube to be welded.

In order to give an understanding of my invention, I have illustrated in the drawings some selected embodiments thereof which will now be described, after which the novel features will be pointed out in the appended claims.

Fig. 1 is a fragmentary view showing a sufficient portion of a welding machine to enable my invention to be understood, said figure showing in section a contact roll embodying my invention;

Fig. 2 is a similar view showing a different form of contact roll;

Fig. 3 is a side view of Fig. 1 on a reduced scale;

Fig. 4 is a partial side view of the contact roll shown in Fig. 2;

Fig. 5 is a view similar to Fig. 1 showing another form of contact roll;

Fig. 6 is an end view of the end of the shaft 28;

Fig. 7 is a perspective view of the locking collar 35.

Inasmuch as the invention relates simply to the contact roll I have not deemed it necessary to illustrate in detail the entire machine. The tube to be welded is shown at 1, said tube having the two abutting edges 2 and 3 that are to be welded together. The welding operation is performed by passing the tube over two contact surfaces which are insulated from each other but connected to the secondary and which are adapted to engage the tube on either side of the joint or seam formed by the edges 2 and 3 and by employing pressure rolls 4 which engage the sides of the tube and force the edges 2 and 3 firmly together, thus completing the weld.

The secondary by which the welding current is furnished to the contact surfaces is shown at 5 and may have any suitable or usual construction. The parts thus far described are parts that are commonly found in electric welding machines of this type and need no further description.

In my present improvements the two contact surfaces which engage the tube either side of the seam to be welded are formed on the same contact roll instead of on two separate rolls, as is usually the case.

Referring first to Fig. 1, the two contact surfaces are shown at 6 and 7, respectively, each being an annular surface. These contact surfaces are formed on a roll indicated generally by 8 which is rotatably mounted on a shaft or spindle 9 associated with the secondary 5. The roll 8 is made in the two parts or halves 10 and 11 which are insulated from each other, and each of which is provided with one of the annular contact surfaces. As herein shown, the roll sections 10 and 11 have the hubs 12 and 13 formed integral therewith through which the spindle 9 extends, said spindle being insulated from the hubs by suitable insulation 14. The roll sections 10 and 11 are also insulated from each other by insulation 15 and may be connected together in any suitable way provided the insulation is maintained. As herein shown, they are connected together by pins 16 of insulating material. The hubs 12 and 13 are rotatively mounted in bearings 17 and 180 which are associated with the secondary 5 and are electrically connected with the poles thereof by being mounted on said poles. Since the contact faces 6 and 7 are separated and insulated from each other, no current can pass from one to the other except when some element is placed across the two surfaces. When, therefore, a tube 1 is placed in position to be welded with the joint between the two edges 2 and 3 situated between the contact surfaces 6 and 7, the circuit will be closed and a welding current will be passed through these abutting edges from one contact surface to the other, thus effecting the weld in usual manner.

In order to provide for changing the shape of the contact surfaces 6 and 7 to correspond to the particular work to be done, I propose to form said contact surfaces on annular contact members 18 and 19 which are detachably secured to the roll sections 10 and 11. These contact members 18 and 19 are herein shown as rings screw-threaded to the periphery of the roll sections. When the rings are properly adjusted they are locked in position by set screws 20. This screw-threaded connection between the contact members 18 and 19 and the roll sections permits the rings to be adjusted toward and from each other to fit the contour of the particular tube to be welded, and this construction also permits the contact members to be entirely removed in order to make way for other larger or smaller contact members.

In Fig. 2 I have shown a little different construction. In the device shown in this figure, the roll sections are shown at 21 and 22, respectively. The roll section 21 is fast on the shaft 23 but insulated therefrom at 24, and the roll section 22 is screw-threaded onto the shaft and electrically connected thereto, as shown at 25. These roll sections are separated from each other by an air space 26 which affords suitable insulation.

The two roll sections 21, 22 are provided with hubs 27, 28, respectively, which are mounted in bearings 29 and 30 that are mounted on the poles of the secondary 5. The two roll sections 21, 22 are thus normally insulated from each other, but are electrically connected to the poles of the secondary. Whenever a tube is placed in position to be welded, as shown in Fig. 2, then the circuit will be closed through the tube thereby permitting the welding operation to be performed.

In order to lock the roll section 22 from turning movement on the shaft 23, I have shown the end of the hub 28 as provided with a plurality of radial recesses 360 and have provided a collar 350 which is adapted to be locked to the shaft by the set screw 370 and which has locking projections 380 adapted to be received in the recesses 360. After the roll section 22 is properly adjusted on the shaft, then the collar 350 will be adjusted with the locking projections occupying certain of the recesses, and said collar may be locked to the shaft by the set screw 370. This will prevent any relative rotary movement between the shaft and roll section 22.

In Figs. 2 and 4 I have shown contact surfaces having a slightly different construction from that shown in Fig. 1. In this embodiment these contact surfaces are in the form of short lengths 31 of copper wire which are clamped to the periphery of the roll sections 21, 22 by clamping rings 32 and 33, respectively. Each wire section 31 will preferably be provided with the flattened face 34 which is designed to rest against and fit the side of the tube 1 to be welded as the tube is passed over the roll. Owing to the comparatively short lengths of the wire sections 31 and the manner in which they are clamped to the roll sections, each wire can turn about its axis more or less, thus permitting the flattened face 34 thereof to assume different angular positions. In this way, the flattened faces of the wire sections will readily adapt themselves to the shape and contour of the tube and a good surface is always provided for.

By making the roll section 22 screw-threaded to the shaft 23 it is possible to adjust these roll sections toward and from each other so as to bring the contact surfaces into the proper position relative to each other to produce the weld.

In Fig. 5 I have shown a still different embodiment of the invention. In this construction the two roll sections are indicated at 35 and 36, respectively, and they are both mounted on the shaft 9, but insulated therefrom, as at 14, and also insulated from each other by the insulation 15. Said roll sections are rigidly connected together by the insulating pins 16. In this respect, the construction shown in Fig. 5 is similar to that shown in Fig. 1. The roll sections 35 and 36 each have a contact member in the form of a ring screw-threaded to the periphery thereof, said contact members being indicated at 37 and 38 respectively, and these contact members are shaped to present the contact surfaces 39 and 40 with which the tube 1 has contact. In this embodiment the contact members 35 and 36 have a slightly different shape from that shown in Fig. 1, they being constructed to provide a greater amount of insulation between the roll sections than is possible with the construction shown in Fig. 1.

While I have illustrated herein some embodiments of my invention, I do not wish to be limited to the constructional features shown.

I claim:

1. A contact roll for a tube-welding machine comprising two roll sections rigidly connected together but insulated from each other, the peripheral portion of each section constituting a contact member and being detachably secured thereto by means which permits its ready removal.

2. A contact roll for a tube-welding machine comprising a spindle, two independent roll sections separate from the spindle but fast thereon, said roll sections being insulated from each other and one at least of said sections being insulated from the spindle.

3. A contact roll for electric welding machines comprising a spindle, two roll sections insulated from each other and fast on the spindle, the peripheral portion of each roll section being separable therefrom and detachably secured thereto by readily-accessible means.

4. In an electric welding machine, the combination with a secondary having two bearings, of a compound contact roll comprising a spindle, and two independent roll sections separate from the spindle but fast thereon, said roll sections being insulated from each other and one at least of said sections being insulated from the spindle, each roll section having a hub journaled in one of the bearings.

In testimony whereof, I have signed my name to this specification.

FREDERICK S. STEARNS.